United States Patent
Song et al.

(10) Patent No.: US 8,135,078 B2
(45) Date of Patent: Mar. 13, 2012

(54) CHANNEL PROFILE ESTIMATION FOR OFDM-BASED COMMUNICATION SYSTEM

(75) Inventors: Kee-Bong Song, Santa Clara, CA (US); Won-Joon Choi, Cupertino, CA (US)

(73) Assignee: Amicus Wireless Technology Ltd. (KY)

( * ) Notice: Subject to any disclaimer, the term of this patent is extended or adjusted under 35 U.S.C. 154(b) by 953 days.

(21) Appl. No.: 12/113,892

(22) Filed: May 1, 2008

(65) Prior Publication Data

US 2008/0273615 A1  Nov. 6, 2008

Related U.S. Application Data

(60) Provisional application No. 60/927,505, filed on May 4, 2007.

(51) Int. Cl.
*H04K 1/10* (2006.01)

(52) U.S. Cl. ........ 375/260; 375/259; 375/343; 375/142; 375/150; 375/340; 370/470; 370/471; 370/473; 370/509; 455/137; 455/231; 455/303

(58) Field of Classification Search .................. 375/260, 375/259, 343, 142, 150, 340; 370/470, 471, 370/473, 509; 455/137, 231, 303
See application file for complete search history.

(56) References Cited

U.S. PATENT DOCUMENTS

| | | | |
|---|---|---|---|
| 2003/0128656 A1* | 7/2003 | Scarpa | 370/203 |
| 2005/0163257 A1* | 7/2005 | Keerthi | 375/340 |
| 2006/0002487 A1 | 1/2006 | Kriedte et al. | |
| 2006/0233097 A1 | 10/2006 | Vrcelj et al. | |
| 2007/0153922 A1* | 7/2007 | Dong et al. | 375/260 |
| 2008/0310532 A1* | 12/2008 | Baggen et al. | 375/260 |

* cited by examiner

*Primary Examiner* — David C. Payne
*Assistant Examiner* — Zewdu Kassa
(74) *Attorney, Agent, or Firm* — Thomas H. Ham; Wilson Ham & Holman

(57) ABSTRACT

A device and method for performing a channel profile estimation for an OFDM-based wireless communication system uses an averaged frequency coherence metric to select a particular channel profile, which is a current channel profile estimate. The averaged frequency coherence metric is derived using correlations between pilot subcarriers of an OFDM-based signal at predefined subcarrier locations for multiple frames of the OFDM-based signal. The selected channel profile may be used for channel estimation, as well as for link adaptation, to improve the performance of these processes.

21 Claims, 5 Drawing Sheets

CHANNEL PROFILE ESTIMATION FOR OFDM-BASED COMMUNICATION SYSTEM

CROSS REFERENCE TO RELATED APPLICATION

This application claims benefit of U.S. Provisional Patent Application Ser. No. 60/927,505, filed on May 4, 2007, which is incorporated herein by reference.

BACKGROUND OF THE INVENTION

Orthogonal frequency division multiplexing (OFDM) is a method of multi-carrier digital communication where wideband information data is distributed across many narrowband "subcarriers" in the frequency domain. Because each individual subcarrier is a narrowband sinusoidal wave, it can be transmitted with less distortion caused by inter-symbol-interference over multipath wireless fading environment. The original information can be recovered at the receiver without a complex equalization process, and is robust in a multipath propagation environment.

Orthogonal frequency division multiple access (OFDMA) is a method of multi-user digital communications, wherein each user utilizes an allotment of the available sub-carriers for their individual communication. The fundamental operation and advantages of OFDMA systems is similar to that of OFDM systems in a multipath wireless propagation environment. So the terms OFDM and OFDMA are used here interchangeably.

An accurate channel estimation in an OFDM receiver is important for the recovery of the transmitted information data at the receiver. If the receiver makes a significant error in its channel estimation, the original modulation symbol can be decoded in error because each subcarrier in the OFDM symbol is multiplied by fading coefficients that have different amplitudes and phases. This is especially true for higher-order 16-QAM and 64-QAM modulation, which are widely used to transmit high data rate signals. However, the accuracy of channel estimations depends on current conditions of a multipath signal propagation environment.

Thus, there is a need for a device and method for performing a channel profile estimation to improve the accuracy of channel estimations.

SUMMARY OF THE INVENTION

A device and method for performing a channel profile estimation for an OFDM-based wireless communication system uses an averaged frequency coherence metric to select a particular channel profile, which is a current channel profile estimate. The averaged frequency coherence metric is derived using correlations between pilot subcarriers of an OFDM-based signal at predefined subcarrier locations for multiple frames of the OFDM-based signal. The selected channel profile may be used for channel estimation, as well as for link adaptation, to improve the performance of these processes.

A method for performing a channel profile estimation for an OFDM-based wireless communication system in accordance with an embodiment of the invention comprises (a) receiving frames of an OFDM-based signal, (b) computing an instantaneous frequency coherence metric for a selected frame of the OFDM-based signal using pilot subcarriers at predefined pilot subcarrier locations, the instantaneous coherence metric providing correlation information between the pilot subcarriers in the selected frame, (c) averaging multiple instantaneous coherence metrics for corresponding multiple frames of the OFDM-based signal to produce an averaged coherence metric, the averaged coherence metric indicating average channel statistics, and (d) selecting a particular channel profile from a plurality of channel profiles using the averaged coherence metric, the particular channel profile being a current channel profile estimate.

A device for performing a channel estimation for an OFDM-based wireless communication system in accordance with an embodiment of the invention comprises a frequency coherence metric computation unit, a metric averaging unit and a profile selection logic. The frequency coherence metric computation unit is configured to compute an instantaneous frequency coherence metric for a selected frame of a OFDM-based signal using pilot subcarriers at predefined pilot subcarrier locations. The instantaneous coherence metric provides correlation information between the pilot subcarriers in the selected frame. The metric averaging unit is operably connected to the frequency coherence metric computation unit. The metric averaging unit is configured to average multiple instantaneous coherence metrics for corresponding multiple frames of the OFDM-based signal to produce an averaged coherence metric. The averaged coherence metric indicates average channel statistics. The profile selection logic is operably connected to the metric averaging unit. The profile selection logic is configured to select a particular channel profile from a plurality of channel profiles using the averaged coherence metric. The particular channel profile is a current channel profile estimate.

A method for performing a channel estimation for an OFDM-based wireless communication system in accordance with an embodiment of the invention comprising (a) receiving frames of an OFDM-based signal, (b) computing an instantaneous frequency coherence metric for a selected frame of the OFDM-based signal using pilot subcarriers at predefined pilot subcarrier locations, the instantaneous coherence metric providing correlation information between the pilot subcarriers in the selected frame, (c) averaging multiple instantaneous coherence metrics for corresponding multiple frames of the OFDM-based signal to produce an averaged coherence metric, the averaged coherence metric indicating average channel statistics, (d) selecting a particular channel profile from a plurality of channel profiles using the averaged coherence metric, the particular channel profile being a current channel profile estimate, (e) computing estimated pilot channel estimates using the pilot subcarriers of the OFDM-based signal, and (f) interpolating the pilot channel estimates based on the particular channel profile to derive data channel estimates for data subcarriers of the OFDM-based signal.

Other aspects and advantages of the present invention will become apparent from the following detailed description, taken in conjunction with the accompanying drawings, illustrated by way of example of the principles of the invention.

DETAILED DESCRIPTION

Figure 1:
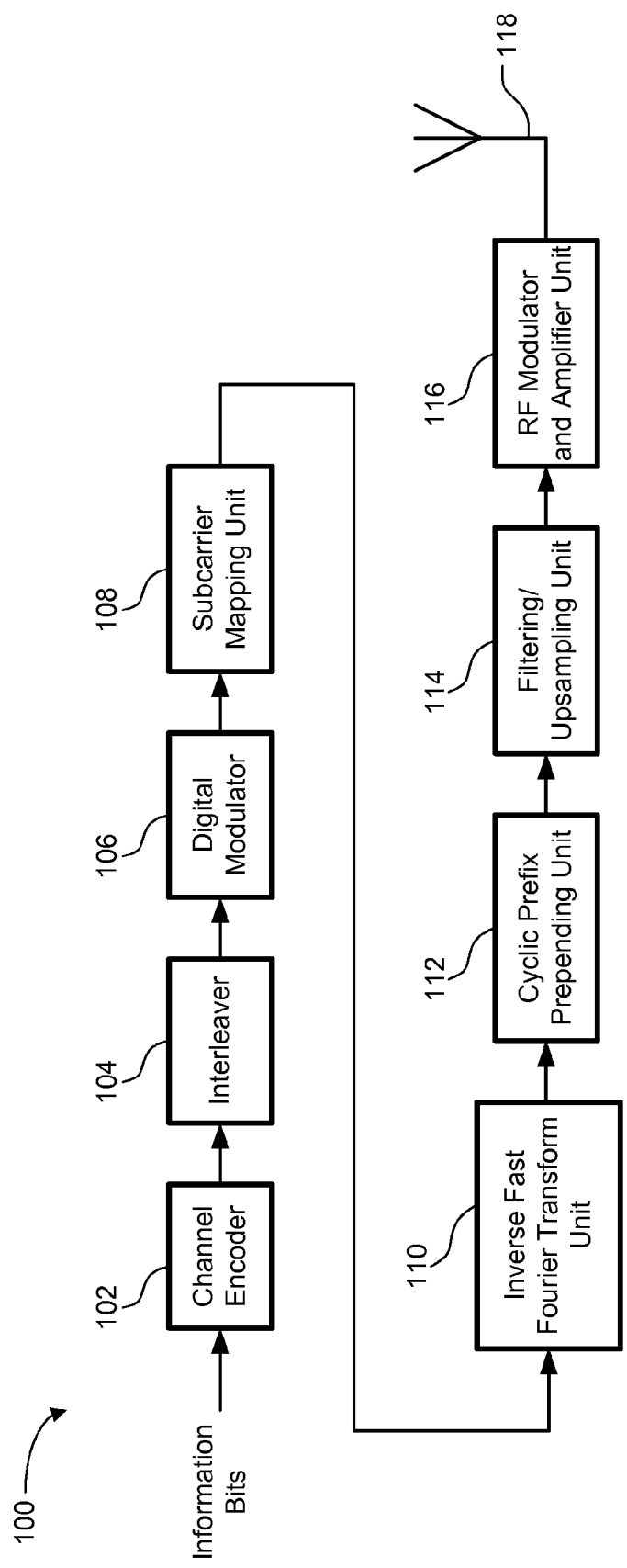
FIG. 1 is a block diagram of an Orthogonal Frequency Division Multiple Access (OFDMA) transmitter in accordance with an embodiment of the invention.

With reference to FIG. 1, an Orthogonal Frequency Division Multiple Access (OFDMA) transmitter 100 in accordance with an embodiment of the invention is described. The OFDMA transmitter 100 is part of an OFDMA wireless communication system. As an example, the OFDMA transmitter 100 may be a component of a base station of an OFDMA wireless communication system.

As shown in FIG. 1, the OFDMA transmitter 100 includes a channel encoder 102, an interleaver 104, a digital modulator 106, a subcarrier mapping unit 108, an inverse fast Fourier transform (IFFT) unit 110, a cyclic prefix prepending unit 112, a filtering/upsampling unit 114, a radio frequency (RF) modulator and amplifier unit 116, and a transmit antenna 118. The channel encoder 102 encodes information bits using convolutional coding, turbo coding, block coding or other well-known forward error correction (FEC) encoding schemes. The interleaver 104 interleaves the encoded bits to provide protection against burst errors that would otherwise occur due to deep channel fading. The digital modulator 106 maps the encoded and interleaved bits into modulation symbols of a quadrature phase shift keying (QPSK), M-ary quadrature amplitude modulation (M-QAM) or M-ary phase shift keying (M-PSK), or similar modulation scheme. The subcarrier mapping unit 108 maps the modulation symbols into data subcarriers in the frequency domain.

The number of data subcarriers available for each OFDMA symbol depends on the size of fast Fourier transform (FFT) that was selected, and the number of guard subcarriers and pilot subcarriers used. A group of N subcarriers, which includes data subcarriers, DC/guard subcarriers and pilot subcarriers, forms a single OFDMA symbol, where N is the FFT size.

Pilot subcarriers have known, fixed characteristics when they are transmitted. A matching receiver can therefore assume that any deviations they observe can be wholly attributed to the channel frequency response, and those differences can be used to compute a channel frequency response estimate. A pilot is strategically placed in each symbol index, at various subcarrier index locations. Sometimes the subcarrier index used for one symbol index can be the same one used for another's symbol index. An estimate of the overall channel frequency response is interpolated from the individual pilots.

The IFFT unit 110 uses IFFT to transform the N subcarriers into time-domain so that the OFDMA symbols will be suitable for sending through a wireless environment. For each OFDMA symbol, the cyclic prefix prepending unit 112 prepends the last M samples at the beginning of each symbol to generate cyclic prefix (CP). This CP serves as a guard period to eliminate the inter-symbol-interference (ISI) between OFDMA symbols in a multipath fading environment. The filtering/upsampling unit 114 filters and up-samples the CP-added OFDMA symbols for pulse shaping. The RF modulator and amplifier unit 116 converts the symbols to RF, and amplifies the signals for transmission via the transmit antenna 118 through a wireless environment. Although the OFDMA transmitter 100 is shown with a single transmit antenna, the OFDMA transmitter may include multiple antennas for multi-input multi-output (MIMO) communication.

Figure 2:
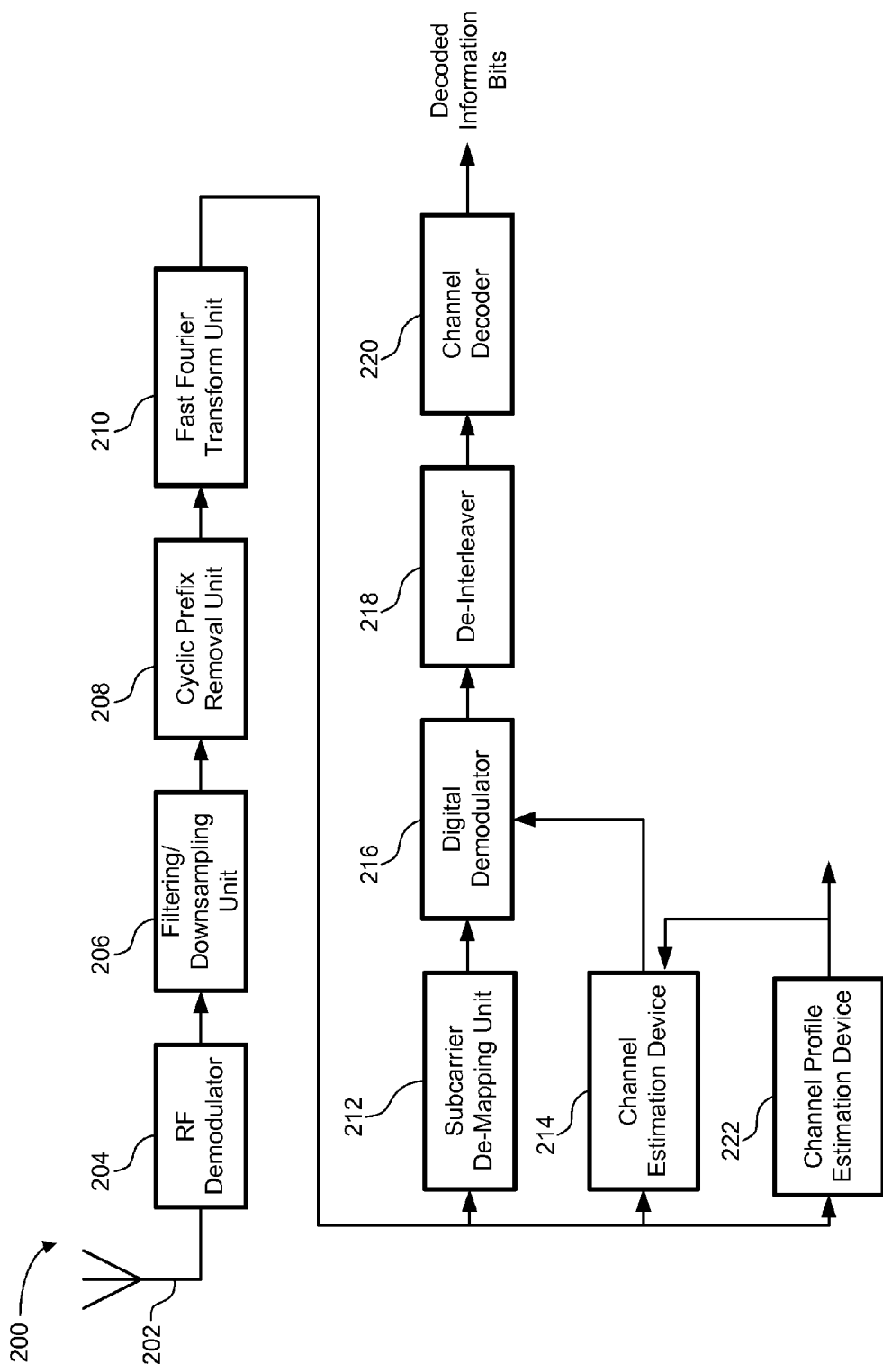
FIG. 2 is a block diagram of an OFDMA receiver in accordance with an embodiment of the invention.

Turning now to FIG. 2, an OFDMA receiver 200 in accordance with an embodiment of the invention is shown. The OFDMA receiver 200 is also part of an OFDMA wireless communication system. As an example, the OFDMA receiver 200 may be a component of a mobile station of an OFDMA wireless communication system.

As shown in FIG. 2, the OFDMA receiver 200 includes a receive antenna 202, an RF demodulator 204, a filtering/downsampling unit 206, a cyclic prefix removal unit 208, a fast Fourier transform (FFT) unit 210, a subcarrier de-mapping unit 212, a channel estimation device 214, a digital demodulator 216, a de-interleaver 218, a channel decoder 220 and a channel profile estimation device 222. The RF demodulator 204 is configured to demodulate the incoming RF signal received by the receive antenna 202. Although the OFDMA receiver 200 is shown with a single receive antenna, the OFDMA receiver may include multiple antennas for MIMO communication. The filtering/downsampling unit 206 filters and down converts the RF-demodulated signal to a baseband signal. The cyclic prefix removal unit 208 removes the samples for the CP portion of the received signal. The FFT unit 210 applies FFT on N received samples per OFDMA symbol to generate N received subcarriers per OFDMA symbol in the frequency domain.

The subcarrier de-mapping unit 212 de-maps the generated subcarriers to extract the subcarriers intended for this particular OFDMA receiver 200. The channel estimation device 214 computes frequency-domain channel estimates for the pilot subcarriers and then interpolates the pilot channel estimates to derive frequency-domain channel estimates for the data subcarriers. In particular, the channel estimation device 214 uses a channel profile estimate information, which is provided by the channel profile estimation device 222, to more accurately derive the channel estimates for the data subcarriers. A channel profile is the statistical characterization of a multipath signal propagation environment. The signal propagation environment can be highly frequency selective, depending on the local scatters. Such statistical information can be used to improve the channel estimation performance of the channel estimation device 214 by adjusting the channel estimation process in response to the channel profile information. The channel profile estimate information from the channel profile estimation device 222 can also be used for link adaptation in a base station, where channel quality indicator (CQI) metric may be computed based on signal-to-noise ratio (SNR) and the channel profile estimate information. Using the computed CQI metric, the modulation and code set (MCS) can be adjusted in order to deliver the best quality of service (QoS). The channel estimation device 214 and the channel profile estimation device 222 are described in more detail below.

The digital demodulator 216 demodulates the received modulation symbols in the data subcarriers using the frequency-domain channel estimates for the data subcarriers from the channel estimation device 214. The digital demodulator 216 compensates the signal attenuation and phase rotation for each subcarrier from the channel estimates. The demodulator output is hard or soft decision of encoded bits. The de-interleaver 218 de-interleaves the bit decisions. The channel decoder 220 decodes the de-interleaved bit decisions to extract the original information bits.

Although the components 102-116 of the OFDMA transmitter 100 and the components 204-222 of the OFDMA receiver 200 are illustrated and described herein as separate units, these components represent functional blocks, and consequently, may or may not be embodied in the form of physically separate units. Thus, some of these components may be combined into integrated modules. Alternatively, one or more of these components may be divided into two or more modules. Furthermore, these components may be implemented in any combination of hardware, firmware and/or software.

The channel profile estimation device 222 operates on the output of the FFT unit 210. The output of the FFT unit 210 can be mathematically described as, $$y_{pilot,n}(m) = H_n(m) p_n(m) + z_n(m) \tag{1}$$

where $y_{pilot,n}(m)$, $p_n(m)$ $H_n(m)$ and $z_n(m)$ are described as follows:
- n: subcarrier index (increasing over frequency);
- m: OFDMA symbol index (increasing over time);
- $y_{pilot,n}(m)$: received pilot subcarrier value of the n-th subcarrier for the m-th OFDMA symbol observed by the receiver;
- $p_n(m)$: transmitted pilot subcarrier value of the n-th subcarrier for the m-th OFDMA symbol that is known both at the transmitter and at the receiver;
- $H_n(m)$: channel response of the n-th subcarrier for the m-th OFDMA symbol to be estimated by the receiver; and
- $z_n(m)$: random thermal noise and/or other interference at the receiver whose value is not known.

Figure 3:
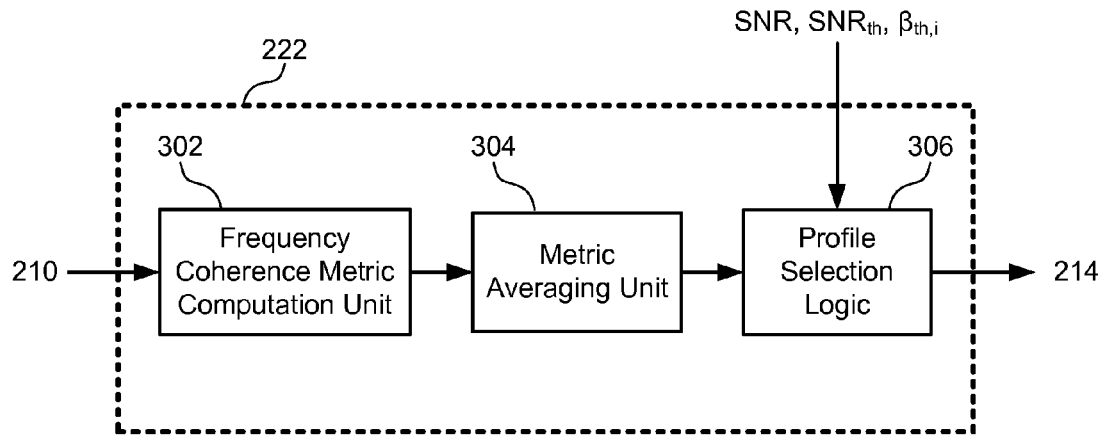
FIG. 3 is a block diagram of a channel profile estimation device in the OFDMA receiver of FIG. 2 in accordance with an embodiment of the invention.

Turning now to FIG. 3, components of the channel profile estimation device 222 in accordance with an embodiment of the invention are shown. As depicted in FIG. 3, the channel profile estimation device 222 includes a frequency coherence metric computation unit 302, a metric averaging unit 304 and a profile selection logic 306. These components of the channel profile estimation device 222 operate to estimate the current channel profile to output channel profile information, which may be used for channel estimation and/or for link adaption.

The frequency coherence metric computation unit 302 is configured to compute an instantaneous frequency metric using pilot subcarriers from one or more OFDM symbols in a single frame of a received OFDM signal transmitted through a wireless multipath signal propagation environment. The instantaneous frequency coherence metric for the k-th frame of an OFDM signal is computed as:

$$\rho_k = \frac{\left( \sum_{m=1}^{M} \sum_{n=1}^{N-\Delta} (p_n(m) y_n(m)) * (p_{n+\Delta}(m) y_{n+\Delta}(m)) \right)}{\left(1 - \frac{\Delta}{N}\right)\left( \sum_{m=1}^{M} \sum_{i=1}^{N} |p_n(m) y_n(m)|^2 \right)}. \tag{2}$$

The numerator in equation (2) is used to compute a correlation coefficient of pilot subcarriers at predefined subcarrier locations (e.g., pilot subcarriers in predetermined subcarrier spacing) across OFDM symbols in the k-th frame of the OFDM. The denominator in equation (2) is used to normalize the correlation coefficient with the received energy of the k-th frame. Thus, the instantaneous frequency coherence metric provides correlation information for pilot subcarriers in a particular frame, which indicates whether the channel is relatively flat or frequency selective. If there is high correlation between the selected pilot subcarriers in a frame of an OFDM signal, then the channel is relatively flat. In this situation, the instantaneous frequency coherence metric derived using equation (2) will approach a value of 1. However, if there is low correlation between the selected pilot subcarriers, then the channel is very frequency selective. In this situation, the instantaneous frequency coherence metric derived using equation (2) will approach a value of 0.

The metric averaging unit 304 is configured to perform time-averaging of instantaneous frequency coherence metric across multiple frames to produce an averaged frequency coherence metric. That is, the computed instantaneous frequency coherence metrics for multiple sequential frames of an OFDM signal are averaged. One possible method is to use a recursive average of squared magnitude of complex correlation coefficient, $$\beta_k = (1-\alpha)\beta_{k-1} + \alpha |\rho_k|^2, \tag{3}$$

where $\alpha$ represents the averaging factor. As an example, $\alpha$ may be equal to $1/64$.

The profile selection logic 306 is configured to use the averaged frequency coherence metric $\beta_k$ from the metric averaging unit 304 to select a channel profile estimate from a plurality of channel profile estimates. The channel profile estimates may be different sets of fading coefficients, which can be used to weigh the pilot subcarriers for channel estimation. In an embodiment, the averaged frequency coherence metric $\beta_k$ is compared to a number of thresholds to quantize the channel profile estimate selection. In addition, signal-to-noise ratio (SNR) information can be used to account for the inaccuracy of frequency coherence metrics at low SNR region. One possible profile selection process performed by the profile selection logic 306 is as follows:

if SNR<$SNR_{th}$, select a first channel profile estimate, e.g., a first channel profile set;
else if $\beta_k > \beta_{th,1}$, select the first channel profile estimate;
else if $\beta_k > \beta_{th,2}$, select a second channel profile estimate, e.g., a second channel profile set; and
else, select a third channel profile estimate, e.g., a third channel profile set, where the thresholds $SNR_{th}$, $\beta_{th,1}$ and $\beta_{th,2}$ are predetermined. The $SNR_{th}$ refers to an SNR threshold below which the multipath channel characteristic is similar to an additive white Gaussian noise (AWGN) channel. Thus, the first channel profile represents a low frequency selective channel. The second and third channel profiles represent medium and high frequency selective channels, respectively. Other profile selection processes may use fewer or more thresholds to quantize channel profile estimates in fewer or more classes. The selected channel profile set can be used in various receiver operations that adapts to the time-varying frequency-selective transmission environment, such as channel estimation and link adaptation/CQI measurement.

Figure 4:
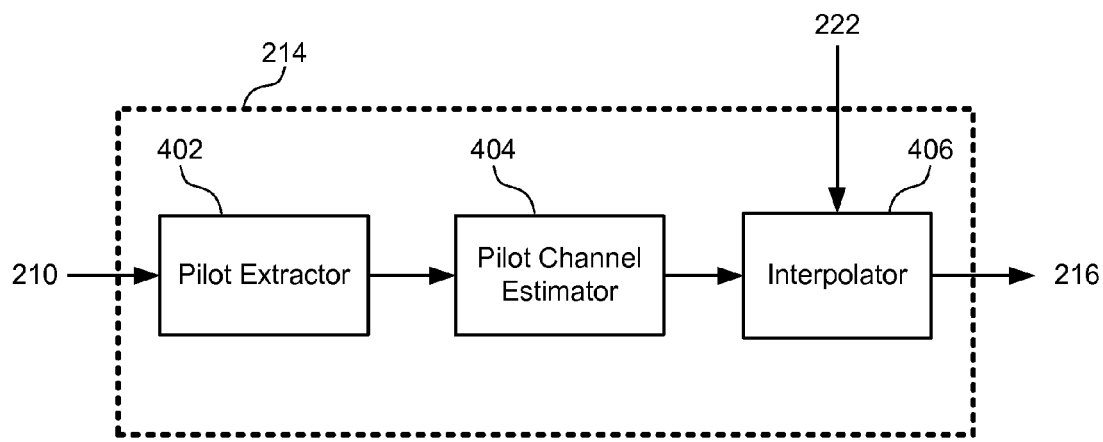
FIG. 4 is a block diagram of a channel estimation device in the OFDMA receiver of FIG. 2 in accordance with an embodiment of the invention.
Figure 5A:
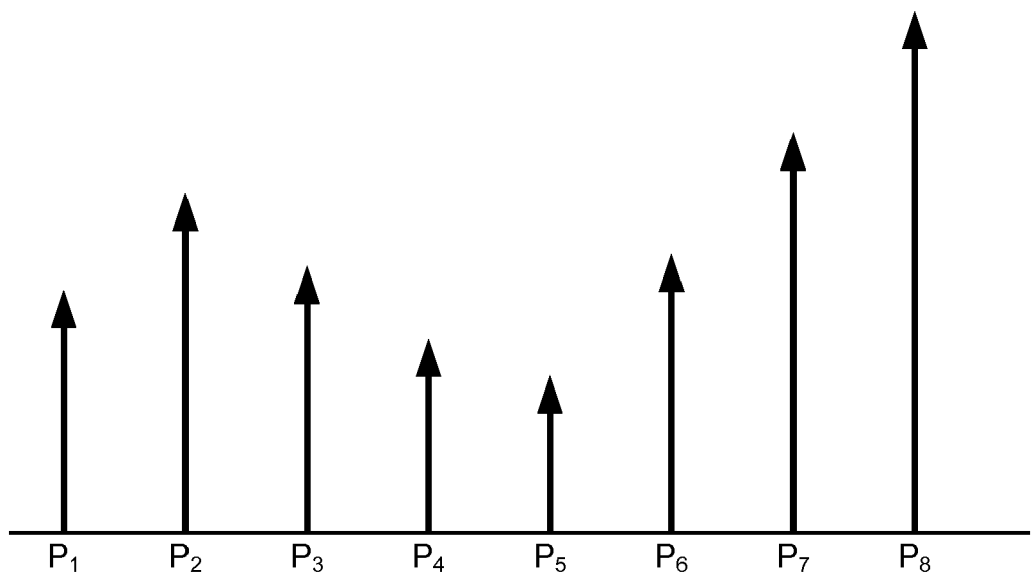
FIG. 5A illustrates estimated pilot channel values at pilot subcarrier locations in accordance with an embodiment of the invention.
Figure 5B:
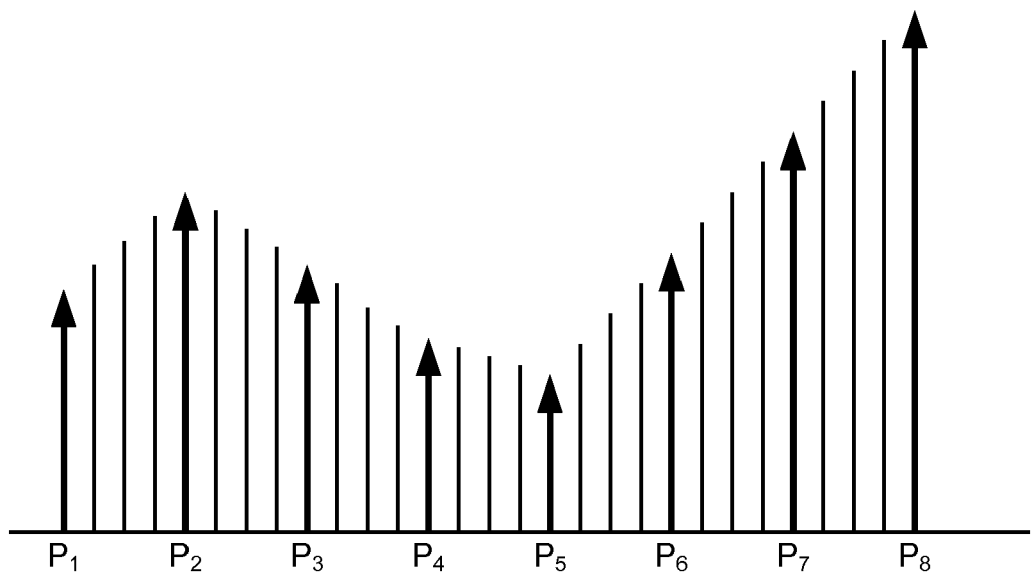
FIG. 5B illustrates estimated data channel values at the data subcarrier locations, which have been interpolated from the estimated pilot channel values, in accordance with an embodiment of the invention.

Turning now to FIG. 4, components of the channel estimation device 214 in accordance with an embodiment of the invention are shown. As depicted in FIG. 4, the channel estimation device 214 includes a pilot extractor 402, a pilot channel estimator 404 and an interpolator 406. The pilot extractor 402 is configured to extract the pilot subcarriers of a received OFDM signal from the output of the FFT unit 210. The pilot channel estimator 404 is configured to compute pilot channel estimate values at pilot subcarrier locations using the extracted pilot subcarriers, as illustrated in FIG. 5A. The interpolator 406 is configured to interpolate the computed pilot channel estimates to derive data channel estimates at the data subcarrier locations between the pilot subcarrier locations, as illustrated in FIG. 5B. The interpolator 406 may be configured to perform any appropriate interpolation process, such as interpolation process in accordance with one of the following interpolation schemes: least square, linear, cubic and polynomial interpolation schemes. In an embodiment, the interpolator 406 receives the current channel profile estimate, for example, a selected channel profile set, to adjust the interpolation process, such as the type of interpolation and/or interpolation coefficients, in order to more accurately perform channel estimation.

Figure 6:
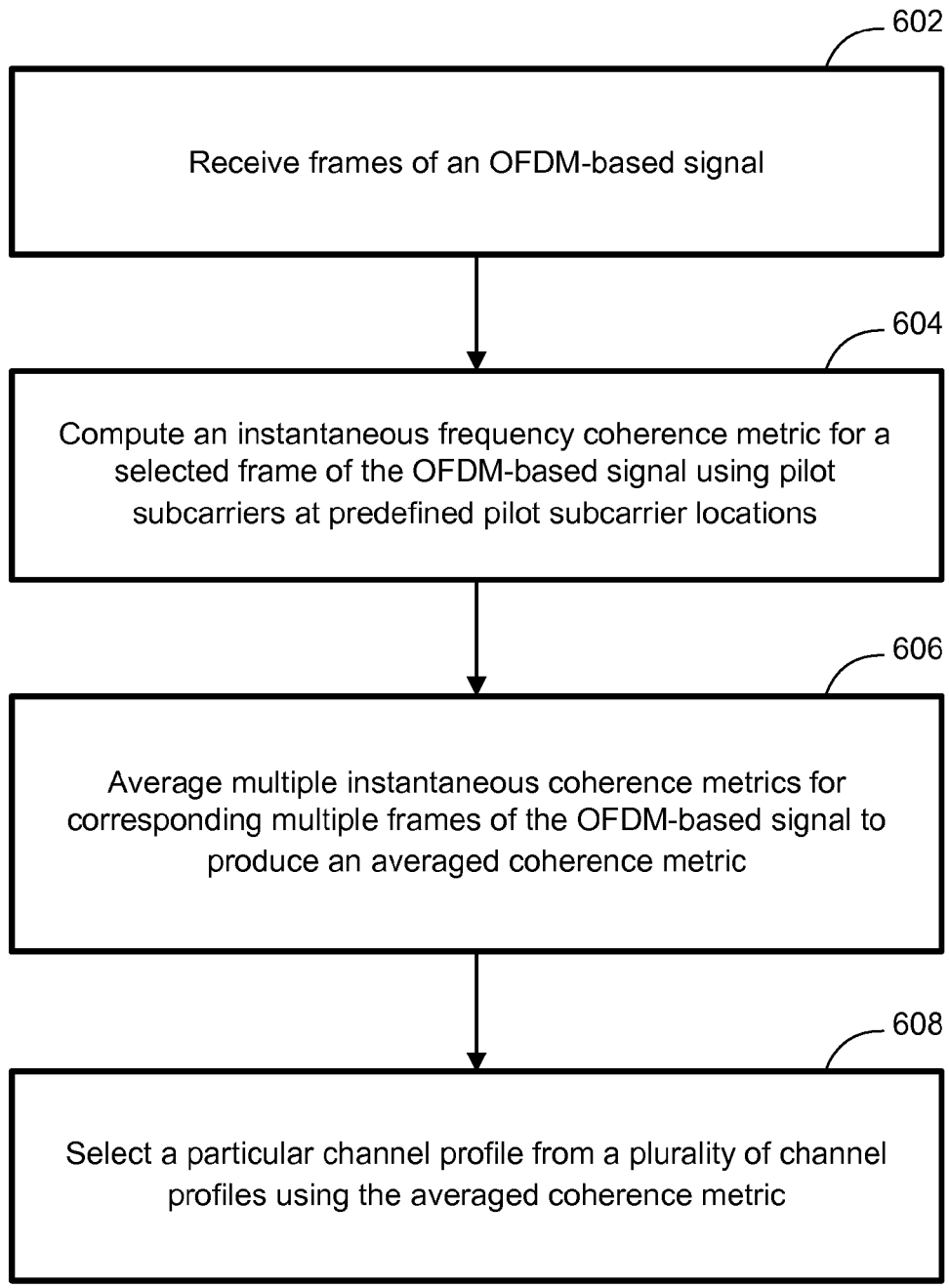
FIG. 6 is a process flow diagram of a method for performing a channel profile estimation for an OFDM-based wireless communication system in accordance with an embodiment of the invention.

A method for performing a channel profile estimation for an OFDM-based wireless communication system is described with reference to a process flow diagram of FIG. 6. At block 602, frames of an OFDM-based signal are received. At block 604, an instantaneous frequency coherence metric for a selected frame of the OFDM-based signal is computed using pilot subcarriers at predefined pilot subcarrier locations. The instantaneous coherence metric provides correlation information between the pilot subcarriers in the selected frame. At block 606, multiple instantaneous coherence metrics for corresponding multiple frames of the OFDM-based signal are averaged to produce an averaged coherence metric. The averaged coherence metric indicate average channel statistics. At block 608, a particular channel profile is selected from a plurality of channel profiles using the averaged coherence metric. The particular channel profile is the current channel profile estimate.

Although specific embodiments of the invention have been mentioned, the invention is not limited to the specific forms or arrangements of parts that are described and illustrated here. The scope of the invention is defined by the claims presented herein and their equivalents.

What is claimed is:

1. A method for performing a channel profile estimation for an OFDM-based wireless communication system, the method comprising:

receiving frames of an OFDM-based signal;

computing an instantaneous frequency coherence metric for a selected frame of the OFDM-based signal using pilot subcarriers at predefined pilot subcarrier locations, the instantaneous coherence metric providing correlation information between the pilot subcarriers in the selected frame, wherein the instantaneous frequency coherence metric is a single value;

averaging multiple instantaneous frequency coherence metrics for corresponding multiple frames of the OFDM-based signal to produce an averaged coherence metric, the averaged coherence metric indicating average channel statistics; and selecting a particular channel profile from a plurality of channel profiles using the averaged coherence metric, the particular channel profile being a current channel profile estimate.

2. The method of claim 1 wherein the computing includes computing the instantaneous frequency coherence metric using only the pilot subcarriers with predetermined subcarrier spacing in the selected frame.

3. The method of claim 2 wherein the computing includes normalizing a correlation coefficient of the pilot subcarriers in the selected frame by a received energy to compute the instantaneous frequency coherence metric.

4. The method of claim 3 wherein the computing includes computing the instantaneous frequency coherence metric using:

$$\rho_k = \frac{\left(\sum_{m=1}^{M}\sum_{n=1}^{N-\Delta}(p_n(m)y_n(m))*(p_{n+\Delta}(m)y_{n+\Delta}(m))\right)}{\left(1-\frac{\Delta}{N}\right)\left(\sum_{m=1}^{M}\sum_{i=1}^{N}|p_n(m)y_n(m)|^2\right)},$$

where:

n represents subcarrier index;

m represents OFDMA symbol index;

$y_{pilot,n}(m)$ represents received pilot subcarrier value of the n-th subcarrier for the m-th OFDMA symbol observed by a receiver;

$p_n(m)$ represents transmitted pilot subcarrier value of the n-th subcarrier for the m-th OFDMA symbol that is known both at a transmitter and at the receiver;

$H_n(m)$ represents channel response of the n-th subcarrier for the m-th OFDMA symbol to be estimated by the receiver; and $z_n(m)$ represents random thermal noise and/or other interference at the receiver whose value is not known.

5. The method of claim 1 wherein the averaging includes averaging the multiple instantaneous frequency coherence metrics using:

$\beta_k = (1-\alpha)\beta_{k-1} + \alpha|\rho_k|^2$, where $\alpha$ represents an averaging factor.

6. The method of claim 1 wherein the selecting includes comparing the averaged coherence metric to one or more thresholds to select the particular channel profile from the plurality of channel profiles.

7. The method of claim 1 wherein the selecting includes comparing a signal-to-noise ratio to a threshold to select the particular channel profile from the plurality of channel profiles.

8. The method of claim 1 wherein the particular channel profile includes a set of fading coefficients.

9. A device for performing a channel estimation for an OFDM-based wireless communication system, the device comprising:

a frequency coherence metric computation unit configured to compute an instantaneous frequency coherence metric for a selected frame of a OFDM-based signal using pilot subcarriers at predefined pilot subcarrier locations, the instantaneous frequency coherence metric providing correlation information between the pilot subcarriers in the selected frame, wherein the instantaneous frequency coherence metric is a single value;

a metric averaging unit operably connected to the frequency coherence metric computation unit, the metric averaging unit being configured to average multiple instantaneous frequency coherence metrics for corresponding multiple frames of the OFDM-based signal to produce an averaged coherence metric, the averaged coherence metric indicating average channel statistics; and a profile selection logic operably connected to the metric averaging unit, the profile selection logic being configured to select a particular channel profile from a plurality of channel profiles using the averaged coherence metric, the particular channel profile being a current channel profile estimate.

10. The device of claim 9 wherein the frequency coherence metric computation unit is configured to compute the instantaneous frequency coherence metric using only the pilot subcarriers with predetermined subcarrier spacing in the selected frame.

11. The device of claim 10 wherein the frequency coherence metric computation unit is configured to normalize a correlation coefficient of the pilot subcarriers in the selected frame by a received energy to compute the instantaneous frequency coherence metric.

12. The device of claim 11 wherein the frequency coherence metric computation unit is configured to compute the instantaneous frequency coherence metric using:

$$\rho_k = \frac{\left(\sum_{m=1}^{M}\sum_{n=1}^{N-\Delta}(p_n(m)y_n(m))*(p_{n+\Delta}(m)y_{n+\Delta}(m))\right)}{\left(1-\frac{\Delta}{N}\right)\left(\sum_{m=1}^{M}\sum_{i=1}^{N}|p_n(m)y_n(m)|^2\right)},$$

where:
n represents subcarrier index;
m represents OFDMA symbol index;
$y_{pilot,n}(m)$ represents received pilot subcarrier value of the n-th subcarrier for the m-th OFDMA symbol observed by a receiver;
$p_n(m)$ represents transmitted pilot subcarrier value of the n-th subcarrier for the m-th OFDMA symbol that is known both at a transmitter and at the receiver;
$H_n(m)$ represents channel response of the n-th subcarrier for the m-th OFDMA symbol to be estimated by the receiver; and
$z_n(m)$ represents random thermal noise and/or other interference at the receiver whose value is not known.

13. The device of claim 9 wherein the metric averaging unit is configured to average the multiple frequency instantaneous coherence metrics using:

$$\beta_k=(1-\alpha)\beta_{k-1}+\alpha|\rho_k|^2,$$

where $\alpha$ represents an averaging factor.

14. The device of claim 9 wherein the profile selection logic is configured to compare the averaged coherence metric to one or more thresholds to select the particular channel profile from the plurality of channel profiles.

15. The device of claim 9 wherein the profile selection logic is configured to compare a signal-to-noise ratio to a threshold to select the particular channel profile from the plurality of channel profiles.

16. The device of claim 9 wherein the particular channel profile includes a set of fading coefficients.

17. A method for performing a channel estimation for an OFDM-based wireless communication system, the method comprising:
receiving frames of an OFDM-based signal;
computing an instantaneous frequency coherence metric for a selected frame of the OFDM-based signal using pilot subcarriers at predefined pilot subcarrier locations, the instantaneous frequency coherence metric providing correlation information between the pilot subcarriers in the selected frame, wherein the instantaneous frequency coherence metric is a single value;
averaging multiple instantaneous frequency coherence metrics for corresponding multiple frames of the OFDM-based signal to produce an averaged coherence metric, the averaged coherence metric indicating average channel statistics;
selecting a particular channel profile from a plurality of channel profiles using the averaged coherence metric, the particular channel profile being a current channel profile estimate;
computing estimated pilot channel estimates using the pilot subcarriers of the OFDM-based signal; and
interpolating the pilot channel estimates based on the particular channel profile to derive data channel estimates for data subcarriers of the OFDM-based signal.

18. The method of claim 17 wherein the computing includes computing the instantaneous frequency coherence metric using only the pilot subcarriers with predetermined subcarrier spacing in the selected frame.

19. The method of claim 18 wherein the computing includes computing the instantaneous frequency coherence metric using:

$$\rho_k = \frac{\left(\sum_{m=1}^{M}\sum_{n=1}^{N-\Delta}(p_n(m)y_n(m))*(p_{n+\Delta}(m)y_{n+\Delta}(m))\right)}{\left(1-\frac{\Delta}{N}\right)\left(\sum_{m=1}^{M}\sum_{i=1}^{N}|p_n(m)y_n(m)|^2\right)},$$

where:
n represents subcarrier index;
m represents OFDMA symbol index;
$y_{pilot,n}(m)$ represents received pilot subcarrier value of the n-th subcarrier for the m-th OFDMA symbol observed by a receiver;
$p_n(m)$ represents transmitted pilot subcarrier value of the n-th subcarrier for the m-th OFDMA symbol that is known both at a transmitter and at the receiver;
$H_n(m)$ represents channel response of the n-th subcarrier for the m-th OFDMA symbol to be estimated by the receiver; and
$z_n(m)$ represents random thermal noise and/or other interference at the receiver whose value is not known.

20. The method of claim 17 wherein the averaging includes averaging the multiple instantaneous frequency coherence metrics using:

$$\beta_k=(1-\alpha)\beta_{k-1}+\alpha|\rho_k|^2,$$

where $\alpha$ represents an averaging factor.

21. The method of claim 17 wherein the selecting includes comparing the averaged coherence metric to one or more thresholds to select the particular channel profile from the plurality of channel profiles.

* * * * *